(12) United States Patent
Holmberg et al.

(10) Patent No.: US 9,502,894 B2
(45) Date of Patent: Nov. 22, 2016

(54) INTERMEDIATE BUS ARCHITECTURE POWER SUPPLY CONTROLLER

(75) Inventors: Torbjorn Holmberg, Kalmar (SE); Magnus Karlsson, Oskarshamn (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 886 days.

(21) Appl. No.: 13/379,094

(22) PCT Filed: Jun. 23, 2009

(86) PCT No.: PCT/EP2009/057785
§ 371 (c)(1),
(2), (4) Date: Dec. 19, 2011

(87) PCT Pub. No.: WO2010/149205
PCT Pub. Date: Dec. 29, 2010

(65) Prior Publication Data
US 2012/0098334 A1    Apr. 26, 2012

(51) Int. Cl.
| G05F 1/577 | (2006.01) |
| H02J 1/08 | (2006.01) |
| G06F 1/32 | (2006.01) |
| H02M 1/00 | (2006.01) |

(52) U.S. Cl.
CPC . *H02J 1/08* (2013.01); *G06F 1/32* (2013.01); *H02M 2001/007* (2013.01); *H02M 2001/008* (2013.01); *Y10T 307/258* (2015.04)

(58) Field of Classification Search
CPC .... H02M 3/155; H02M 3/156; H02M 3/158; H02M 3/33561; H02M 2001/007; H02M 2001/009; H02M 2001/0045; G05F 1/577; G05F 1/563

USPC .............. 323/266, 267; 307/11, 12
See application file for complete search history.

(56) References Cited

U.S. PATENT DOCUMENTS

| 7,888,919 | B2 * | 2/2011 | Dishman et al. | ............. 323/266 |
| 8,179,705 | B2 * | 5/2012 | Chapuis | ........................ 363/141 |
| 2005/0281058 | A1 | 12/2005 | Batarseh et al. | |
| 2008/0232141 | A1 | 9/2008 | Artusi et al. | |
| 2012/0297104 | A1 * | 11/2012 | Thottuvelil et al. | .......... 710/305 |

FOREIGN PATENT DOCUMENTS

WO    2009146259 A1    12/2009

* cited by examiner

*Primary Examiner* — Gary L Laxton
*Assistant Examiner* — Kevin H Sprenger
(74) *Attorney, Agent, or Firm* — Rothwell, Figg, Ernst & Manbeck, P.C.

(57) ABSTRACT

A voltage controller (700) operable to generate control signals for controlling an intermediate bus voltage ($V_{IB}$) in an intermediate bus architecture power system (100), the intermediate bus voltage comprising a voltage output from a first stage DC/DC power converter (200) to at least one second stage DC/DC power converter (500-1 to 500-K). The voltage controller (700) comprises a receiver operable to receive at least one of voltage and current values input to the first stage DC/DC power converter (200). The voltage controller (700) further comprises a efficiency measuring unit operable to determine a measure of the efficiency of the intermediate bus architecture power system in accordance with the received values, and a control signal generator operable to generate control signals in dependence upon the determined efficiency measure to cause the first stage DC/DC converter (200) to set the intermediate bus voltage ($V_{IB}$).

17 Claims, 7 Drawing Sheets

INTERMEDIATE BUS ARCHITECTURE POWER SUPPLY CONTROLLER

CROSS-REFERENCE TO RELATED APPLICATION

This application is a 35 U.S.C. §371 National Phase Entry Application from PCT/EP2009/057785, filed Jun. 23, 2009, and designating the United States.

TECHNICAL FIELD

The present invention relates to the field of Intermediate Bus Architecture power systems and more specifically to control of the intermediate bus voltage in such systems.

BACKGROUND

The demand for ever faster and more complex signal and data processing in diverse fields of application has fuelled the need for new generations of signal processing systems having multiple high-performance ULSI circuits (e.g. processors, ASICs and FPGAs), which are characterised by their need for multiple low supply voltages, high levels of current demand and tight supply voltage regulation requirements. These needs are met by the so-called Intermediate Bus Architecture (IBA) power supply, which may provide a number of tightly-regulated voltages from an input power source via a two-stage voltage conversion arrangement.

FIG. 1 is a schematic of a conventional IBA power supply. The IBA power system 10 is a two-stage power distribution network comprising a first stage DC/DC converter 20 connected to an input power bus 30, which is typically at a voltage $V_{DCH}$ between 36-75 V, 18-36 V or 18-60 V. The first stage DC/DC converter 20 is connected via the Intermediate Voltage Bus (IVB) to the inputs of a number (K) of second stage DC/DC converters 50-1 to 50-K.

The first stage DC/DC converter 20, commonly referred to as an Intermediate Bus Converter (IBC), is preferably an isolated DC/DC converter. An IBA power supply having such a first stage DC/DC converter has the advantage of being more efficient and more cost-effective to manufacture by reason of the isolation from the input power bus, which generally requires the use of relatively costly components including a transformer, being provided at a single converter. Naturally, the IBC 20 may alternatively be non-isolated from the input power bus 30. The IBC 20 is typically implemented in the efficient form of a switched mode power supply (SMPS), which may be fully regulated or line regulated to convert the input power bus voltage $V_{DCH}$ to a lower intermediate bus voltage $V_{IB}$ on the IVB. However, in the interests of maximising the efficiency of the IBC, the IBC is typically chosen to provide an unregulated output voltage, taking the form of a fixed voltage conversion ratio DC/DC converter. Thus, the IBC 20 provides a fixed voltage conversion ratio (i.e. input-to-output ratio), most commonly 4:1, 5:1 or 6:1.

In the example of FIG. 1, each of the plurality of second stage DC/DC converters 50-1 to 50-K is a non-isolated buck regulator commonly referred to as a Point-of-Load (POL) converter or regulator, or a Point-of-Source regulator. In general, each of the second stage DC/DC converters may be isolated or non-isolated. However, where isolation is provided by the IBC 20, the POL regulators are preferably all non-isolated. A second stage DC/DC converter may take the form of an SMPS or a non-switched linearly-regulated Low Drop Out (LDO) regulator. Each POL (k) delivers a regulated voltage $V_{out\_k}$ to its load 60-k. In the example of FIG. 1, POL regulators 50-1 and 50-2 deliver power to a common load 60-1 (although, naturally, more than two POL regulators may deliver power to a common load). With the step-down ratio of the IBC 20 fixed at a pre-selected value, the voltage $V_{IB}$ on the IVB will of course vary with changes in the input voltage $V_{DCH}$, thus requiring the POL converters to be capable of operating over a range of input voltages, for example 3-15 V.

Although the IBC 20 and the POL regulators 50-1 to 50-K are buck regulators in the example of FIG. 1, their topology is not limited to such and may alternatively be Boost, Buck-Boost etc.

Efficiency is, of course, a critical parameter of any power supply system. The prevailing approach to improving the efficiency of IBA power systems has been to maximise the efficiencies at which the individual converters, i.e. the IBC 20 and POL converters 50-1 to 50-K, operate under typical load conditions. As noted above, designers have sought to increase the efficiency of the IBC by dispensing with voltage regulation altogether, thus avoiding the associated burden placed on the input power bus or other power source by the required regulation circuitry, and allowing the IBC to operate at an optimum duty cycle. The voltage conversion ratio of the IBC is consequently fixed. Since the POL converters operate most efficiently and reliably with a limited ratio between their input and output voltages (i.e. $V_{IB}$ and $V_{out\_k}$, respectively), the fixed value of the IBC's conversion ratio is selected such that the intermediate bus voltage $V_{IB}$ output by the IBC during expected operating conditions falls within a range of values at which the POL converters are able to operate most efficiently.

Despite the successes of the above approach, there still remains a need to improve the efficiency of IBA power systems.

SUMMARY OF THE INVENTION

The present invention was conceived with a view to improving the efficiency of an IBA power supply system. More specifically, the present invention was born out of the inventors' insight that mitigation of the distribution loss (that is, the loss through resistive heating) in the intermediate voltage bus, by adjustment of the intermediate bus voltage in response to a determination of a variable that provides a measure of the IBA system efficiency, such as the power input to or dissipated in the IBA power system, can yield a gain in the efficiency of the IBA power system which outweighs the inefficiency cost that is inherent in the regulation of the first stage DC/DC converter, thereby improving the overall efficiency of the IBA power system.

According to the present invention, there is provided a voltage controller operable to generate control signals for controlling an intermediate bus voltage in an intermediate bus architecture power system, the intermediate bus voltage comprising a voltage output from a first stage DC-to-DC power converter to at least one second stage DC-to-DC power converter via the intermediate voltage bus in the intermediate bus architecture power system. The voltage controller comprises a receiver operable to receive at least one of voltage and current values input to the first stage DC-to-DC power converter. The voltage controller further comprises an efficiency measuring unit operable to determine a measure of an efficiency of the intermediate bus architecture power system in accordance with the received values, and a control signal generator operable to generate control signals in dependence upon the determined efficiency measure to cause the first stage DC-to-DC converter to set the intermediate bus voltage.

The present invention also provides an intermediate bus architecture power system having a voltage controller as set out above.

The present invention further provides a method of generating control signals for controlling an intermediate bus voltage in an intermediate bus architecture power system, the intermediate bus voltage comprising a voltage output from a first stage DC-to-DC power converter to at least one second stage DC-to-DC power converter via the intermediate voltage bus in the intermediate bus architecture power system. The method comprises receiving at least one of voltage and current values input to the first stage DC-to-DC power converter. The method further comprises determining a measure of an efficiency of the intermediate bus architecture power system in accordance with the received values, and generating control signals in dependence upon the determined efficiency measure to cause the first stage DC-to-DC converter to set the intermediate bus voltage.

The present invention further provides a computer program product comprising a computer-readable storage medium or a signal carrying computer program instructions which, if executed by a processor, cause the processor to perform a method as set out above.

In preferred embodiments of a voltage controller described herein below, the determined efficiency measure that is used to control the intermediate bus voltage comprises one or more of a power input to the IBA power system, a power loss therein, and a ratio between a power input to the system and a power output thereby. Using an efficiency measure comprising the input power or power loss has particular advantages because no division operation needs to be performed, thereby reducing computational complexity and time.

It will be appreciated that the voltage controllers of the embodiments that will be described in the following cause the intermediate bus voltage to be automatically tuned towards a value that provides optimal system efficiency for the prevailing load conditions or to be adjusted to remain in the proximity of its optimal value.

BRIEF DESCRIPTION OF THE DRAWINGS

Embodiments of the invention will now be explained by way of example only, in detail, with reference to the accompanying figures, in which.

DETAILED DESCRIPTION OF EMBODIMENTS

First Embodiment

Figure 1:
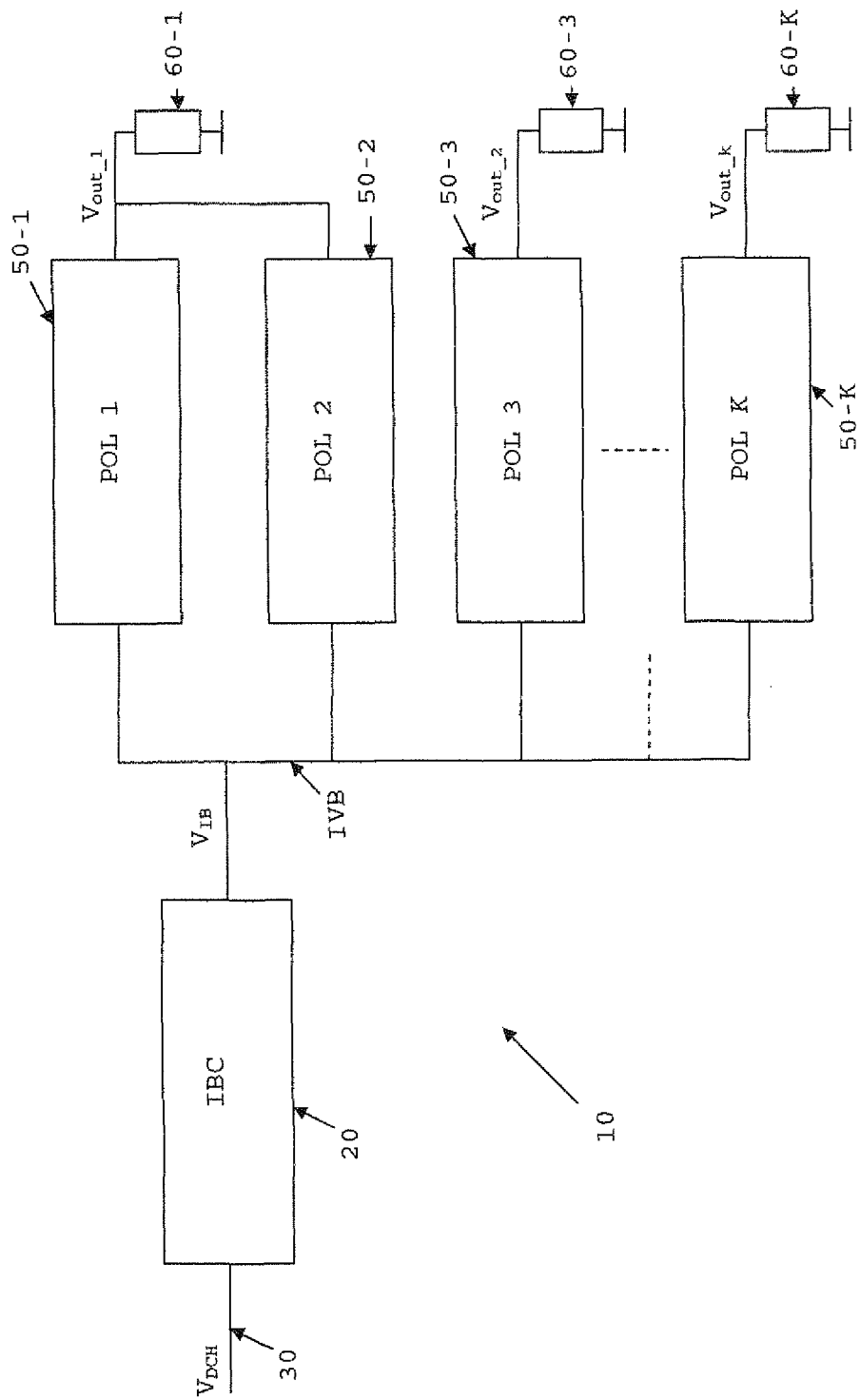
FIG. 1 is a schematic of a conventional IBA power system.
Figure 2:
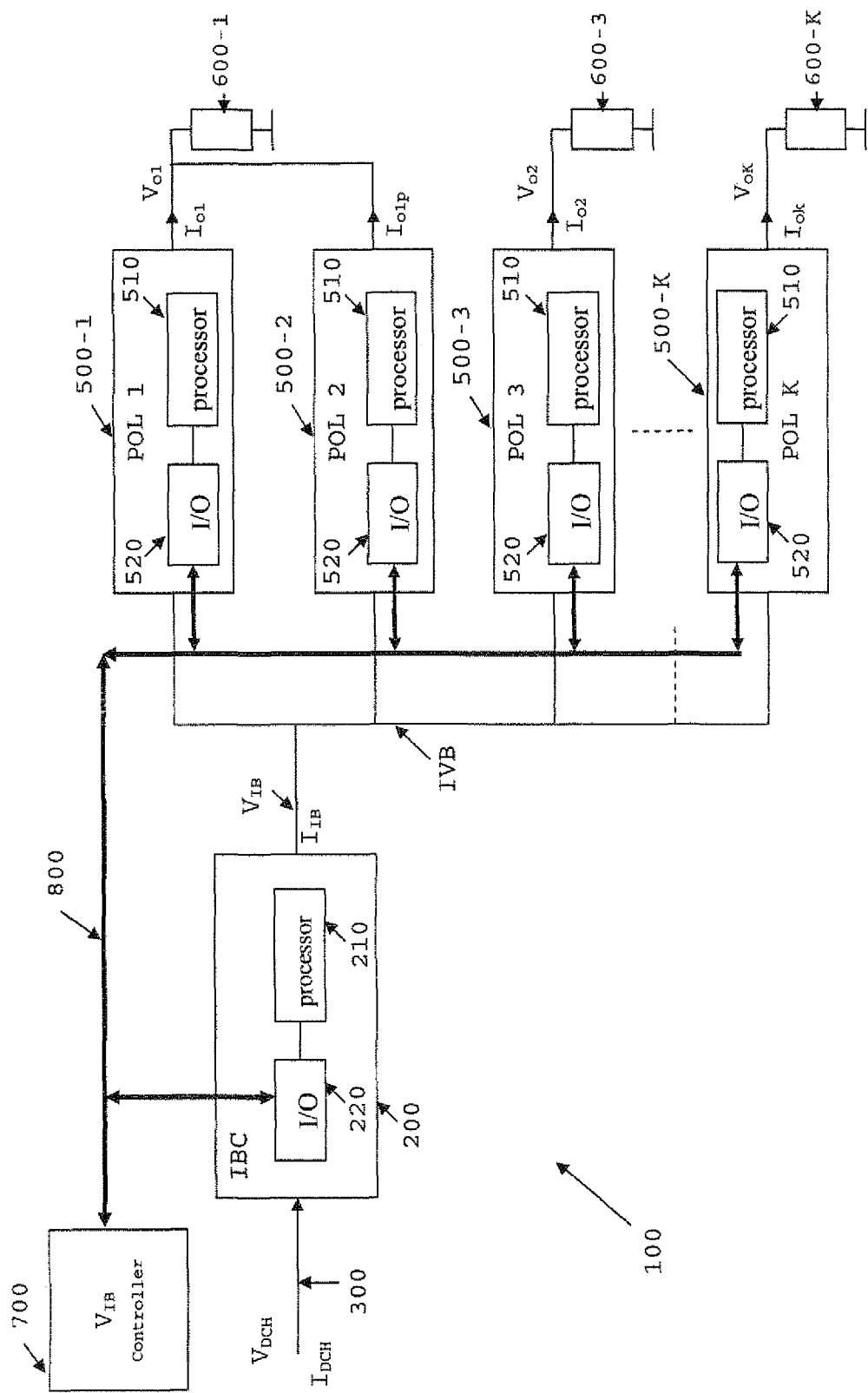
FIG. 2 is a schematic of an IBA power system according to an embodiment of the present invention.

FIG. 2 is a schematic of an IBA power system 100 according to a first embodiment of the present invention.

The IBA power system 100 is a two-stage power distribution network comprising a first stage DC/DC converter 200 connected via an intermediate voltage bus (IVB) to a number K (where K≥1) of second stage DC/DC converters 500-1 to 500-K. An input power bus 300 is connected to the input of the first stage DC/DC converter 200.

The first stage DC/DC converter 200 is preferably an isolated DC/DC converter. An IBA power supply having such a first stage DC/DC converter or IBC has the advantage of being more efficient and more cost-effective to manufacture because isolation from the input power bus, which generally requires the use of relatively costly components including a transformer, is provided at a single converter. Alternatively, the IBC 200 may be non-isolated from the input power bus 300. The IBC 200 is preferably implemented in the efficient form of an SMPS, which can be fully regulated or line regulated to convert the input power bus voltage to a lower intermediate bus voltage $V_{IB}$ on the IVB.

The IBC 200 of the present embodiment has a signal processor 210 and an input/output (I/O) interface 220 by which it can be digitally controlled and managed by a voltage controller 700, which will be described in detail below. Control signals and information are exchanged between the controller 700 and the IBC 200 via an information channel, preferably in the form of a Power Management Bus (PMBus) 800, which may be parallel or serial. The IBC 200 is capable of adjusting the value of $V_{IB}$ at its output in accordance with the received control signals.

As shown in FIG. 2, the IBC 200 is connected via the IVB to the inputs of a number K of second stage DC/DC converters 500-1 to 500-K. In the present embodiment, each of the plurality of second stage DC/DC converters is a non-isolated POL regulator in the form of an SMPS. However, a second stage DC/DC converter is not limited to such and may alternatively be a non-switched converter, such as a Low Drop Out (LDO) (linear) regulator. Furthermore, some or all of the second stage DC/DC converters may alternatively be isolated but where isolation is provided by the IBC 200, it is advantageous from a cost perspective for the second stage DC/DC converters to be non-isolated. Each POL (k) delivers a regulated output voltage $V_{out\_k}$ to its load 600-k. In the present embodiment, POL regulators 500-1 and 500-2 deliver power to a common load 600-1 (although, more generally, one, two or more than two POL regulators may deliver power to a load).

Each of the POL converters is provided with a signal processor 510 and an input/output (I/O) interface 520 by which it can be digitally controlled and managed by the controller 700 via the PMBus 800, as will be explained in the following.

Figure 3:
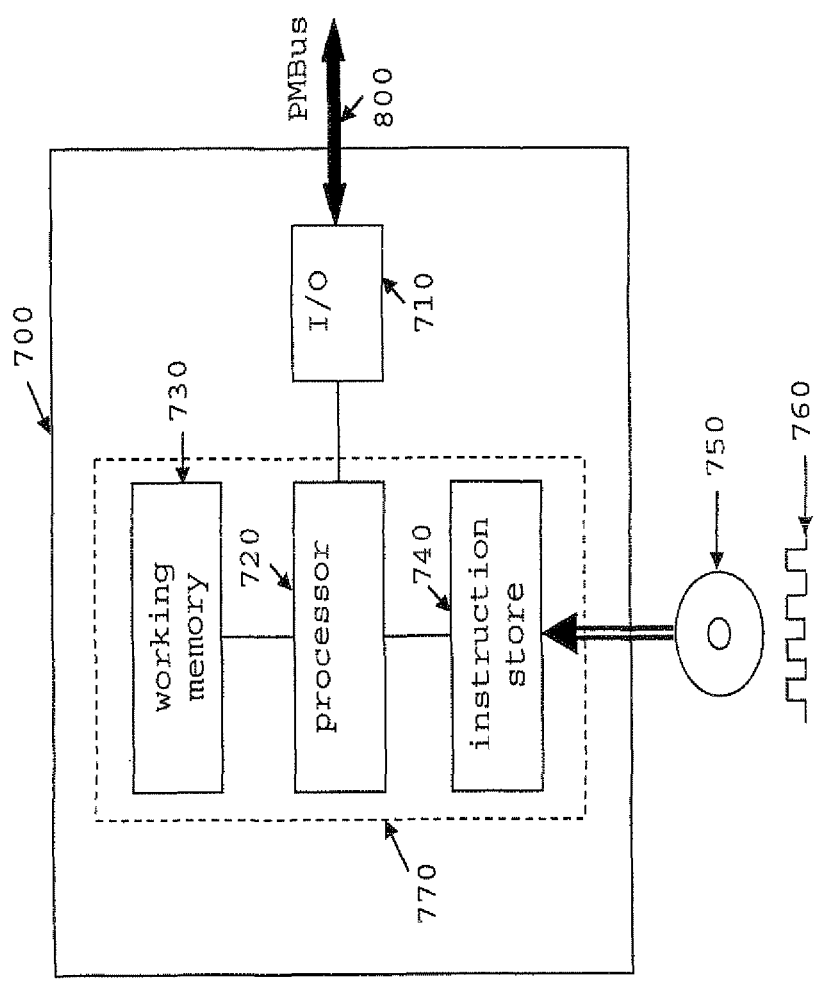
FIG. 3 shows the components of the voltage controller of FIG. 2.

FIG. 3 is a detailed illustration of the voltage controller 700 shown in FIG. 2. The controller 700 comprises an input/output (I/O) or receiving section 710 for receiving information from the IBC 200 and the POL converters 500-1 to 500-K. The receiving section 710 is connected to the I/O interfaces of the IBCs and the POL converters via the PMBus 800, which enables an exchange of information and control signals therebetween. In particular, the receiving section 710 of the controller 700 of the present embodiment is configured to receive information concerning the IBC's operating conditions, including its measured input voltage $V_{DCH}$ and/or input current $I_{DCH}$. The receiving section 710 is further configured to receive information concerning the POL regulators' operating conditions, including their respective measured output voltages $V_{ok}$ and/or output currents $I_{ok}$.

The receiving section 710 of the voltage controller is preferably further configured to receive other parameters from the IBC and POL converters such as their duty cycles, temperatures, system status information for fault monitoring and diagnostics etc. These parameters may be used by the controller for any useful or desirable purpose, for example to implement safety features such as protective cut-offs which ensure that critical parameters such as the component temperatures do not exceed pre-determined thresholds. Alternatively, the controller 700 may forward some or all of the received information to a higher-level system which may be located off the board on which the IBA power system 100 is formed.

As shown in FIG. 3, the voltage controller 700 further comprises a processor 720, a working memory 730 and an instruction store 740 storing computer-readable instructions which, when executed by the processor 720 cause the processor to perform the processing operations hereinafter described to calculate a power input to, a power output by, and a power dissipated in the IBA system, and generate control signals for setting the intermediate bus voltage. The instruction store 740 may comprise a ROM which is pre-loaded with the computer-readable instructions. Alternatively, the instruction store 740 may comprise a RAM or similar type of memory, and the computer readable instructions can be input thereto from a computer program product, such as a computer-readable storage medium 750 such as a CD-ROM, etc. or a computer-readable signal 760 carrying the computer-readable instructions.

In the present embodiment, the combination 770 shown in FIG. 3 comprising the processor 720, the working memory 730 and the instruction store 740 constitutes an efficiency measuring unit and a control signal generator for generating control signals to cause the IBC 200 to set the intermediate bus voltage. The efficiency measuring unit and the control signal generator will now be described in detail with reference to FIGS. 2 and 3.

As shown in FIG. 3, the voltage controller 700 comprises an efficiency measuring unit 770 in communication with the receiving section 710. The efficiency measuring unit 770 is arranged to determine a measure of the efficiency of the IBA power system using the current and/or voltage values received by the receiving section 710.

More specifically, the efficiency measuring unit 770 of the present embodiment is configured to calculate, as the measure of the system efficiency, the power loss in the system; that is, the difference between the power input to the IBA system via the IBC 200 (i.e. the product $I_{DCH}V_{DCH}$ in the embodiment of FIG. 2) and the power output by the IBA system via the POL converters 500-1 to 500-K (in other words, the sum over all of the POL converters of the respective power outputs as given by product of the output current and voltage, $$\sum_{k=1}^{K} I_{ok}V_{ok}\right).$$

If it is assumed that the output voltage of one or more of the POL converters is tightly regulated such that any variations therein are insignificant, then it may suffice for the efficiency measuring unit 770 to calculate the power loss using an assumed value for the output voltages of those POL converters which are stored in memory 730, together with corresponding received values of their output currents. Similarly, if the variations in the input power bus voltage $V_{DCH}$ are assumed to be insignificant, the efficiency measuring unit 770 may perform its power loss calculation using a stored nominal value for $V_{DCH}$ together with the received value for $I_{DCH}$. However, it is preferable for the receiving section 710 to receive values of both the current and voltage input to the IBC 200 and values of both the load current and voltage output by each of the POL converters 500-1 to 500-K, and for the efficiency measuring unit 770 to calculate the power loss in accordance with those received values.

As noted above, the voltage controller of the present embodiment further comprises a control signal generator 770. The control signal generator 770 is arranged to generate, on the basis of the power loss value calculated by the efficiency measuring unit, control signals for use by the IBC 200 to set the intermediate bus voltage $V_{IB}$. The control signal generator may transmit the generated control signals to the IBC 200 via the PMBus 800 at a timing determined thereby or in response to control signal requests made by the IBC. The IBC is configured to adjust the intermediate bus voltage using the received control signals.

The voltage controller 700 may be provided as a stand-alone hardware component, as illustrated in FIG. 2, or may be integrated as part of an on-board controller (not shown), IBC 200 or a POL converter, or as part of an off-board controller.

The processing operations performed by the voltage controller 700 in the present embodiment to generate control signals by which the IBC 200 can adjust the intermediate bus voltage $V_{IB}$ will now be explained with reference to FIGS. 4 and 5.

Figure 4:
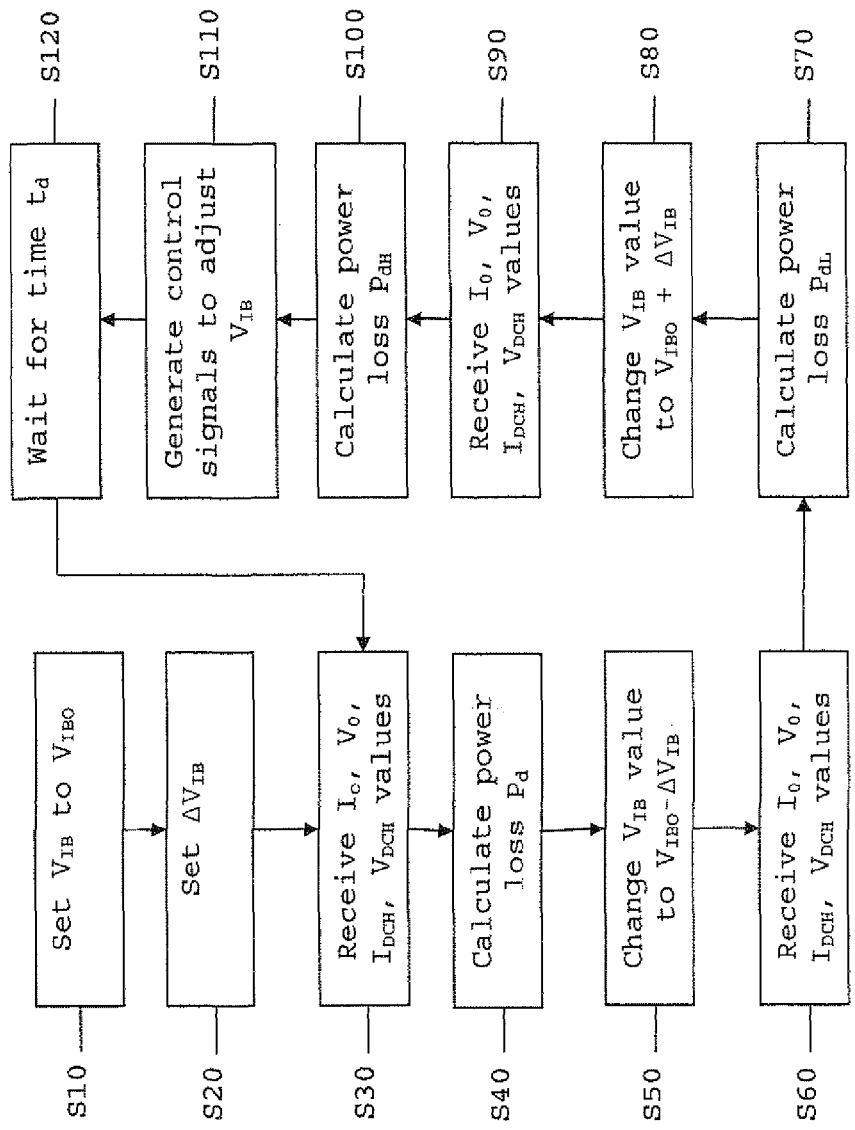
FIG. 4 is a flow diagram illustrating the method of controlling the intermediate bus voltage in the first embodiment.

FIG. 4 is a flow diagram illustrating the operations performed by the voltage controller 700 in an embodiment of the invention. The process begins with step S10, where during start-up of the IBA power system the control signal generator 770 sets the intermediate bus voltage $V_{IB}$ to an initial value $V_{IB0}$, which is selected to ensure safe operation.

At step S20, the efficiency measuring unit 770 sets an intermediate bus voltage step size $\Delta V_{IB}$ to a value which may correspond to a default value stored in memory 740 or which may be selected by the efficiency measuring unit from a plurality of stored values.

At step S30, the voltage controller 700 issues information request signals to the IBC 200 and the POL converters 500-1 to 500-K via the PMBus 800. The receiving section 710 of the voltage controller 700 then receives from the IBC via the PMBus 800 the values of the input power bus voltage $V_{DCH}$ and the current $I_{DCH}$ input to the IBC 200. The receiving section also receives via the PMBus 800 the values of the current and voltage output by each of the POL converters, i.e. $V_{o1}, I_{o1}, V_{o2}, I_{o2}, \ldots V_{oK}, I_{oK}$. Although the receiving section 710 receives both the current and voltage values from the IBC 200 and each of the POL converters 500-1 to 500-K in the present embodiment, the receiving section may alternatively receive only the current values from the IBC and one or more of the POL converters. In this case, the values for the respective voltages may be stored by the voltage controller (e.g. in instruction store 740) for use in the power loss calculations which are performed by the efficiency measuring unit 770 in steps S40, S70 and S100, which are described below.

In step S40, the efficiency measuring unit 770 calculates a first value $P_d$ for the system power loss, which corresponds to the power loss associated with the presently set value of the intermediate bus voltage, which at this stage is $V_{IB0}$. The power loss calculation is performed by calculating the total power output by the POL converters 500-1 to 500-K using the values received by the receiving section 710 and any values that are stored in the voltage controller. In other words, the efficiency measuring unit calculates the output power $P_o$ as given by:

$$P_o = V_{o1} \cdot I_{o1} + V_{o2} \cdot I_{o2} + \ldots + V_{oK} \cdot I_{oK} \qquad \text{Eqn. 1}$$

However, if the power output of one or more of the POL converters is sufficiently small to have no significant effect on the operation of the voltage controller in generating the control signals, the contribution of these POL converters to the calculated output power $P_o$ is preferably neglected in the calculation of $P_o$ in step S40 (and similarly in steps S70 and S100 described below), thus speeding up the power loss calculation. Of course, in this case it is preferable for the receiving section 710 not to acquire the corresponding value(s) of current and/or voltage in step S30 (and similarly in steps S60 and S90 described below).

The efficiency measuring unit 770 also calculates the power input to the IBC 200 using the received values of the input current and voltage, $I_{DCH}$ and $V_{DCH}$ (or a received value of either $I_{DCH}$ or $V_{DCH}$ together with a stored value of the remaining parameter). In other words, the efficiency measuring unit calculates the input power $P_i$, as given by:

$$P_i = V_{DCH} \cdot I_{DCH} \qquad \text{Eqn. 2}$$

Using the calculated values of $P_i$ and $P_o$, the efficiency measuring unit 770 calculates the first power loss value $P_d$ by evaluating the difference between $P_o$ and $P_i$, i.e. $P_d = P_i - P_o$.

In step S50, the control signal generator 770 generates a control signal instructing the IBC 200 to decrement the intermediate bus voltage from its current value $V_{IB0}$ to a first changed value $V_{IBL} = V_{IB0} - \Delta V_{IB}$. The generated control signal is communicated to the IBC 200 via the PMBus 800, causing the IBC to change the intermediate bus voltage from $V_{IB0}$ to the value $V_{IBL}$.

In step S60, the voltage controller 700 transmits information requests to the IBC and the POL converters via the PMBus 800. The receiving section 710 then receives from the IBC 200 the values of the input power bus voltage $V_{DCH}$ and the current $I_{DCH}$ input to the IBC. The receiving section also receives the values of the current and voltage output by each of the POL converters, i.e. $V_{o1}, I_{o1}, V_{o2}, I_{o2}, \ldots V_{oK}, I_{oK}$. Although the receiving section 710 receives both the current and voltage values from the IBC 200 and each of the POL converters 500-1 to 500-K in the present embodiment, as in step S30, the receiving section may alternatively receive only the current values from the IBC and one or more of the POL converters. In this case, the values for the respective voltages may be stored by the voltage controller (e.g. in instruction store 740) for use in the power loss calculations which are performed by the efficiency measuring unit 770.

In step S70, the efficiency measuring unit 770 calculates a second value $P_{dL}$ for the system power loss, which corresponds to the power loss associated with the first changed value of the intermediate bus voltage, $V_{IBL}$. The second power loss value $P_{dL}$ is calculated by the efficiency measuring unit 770 by the same process as used in step S40. In other words, the value $P_{iL}$ of the power input to the IBC while the intermediate bus voltage is set to $V_{IBL}$ is calculated using the received values of the IBC input current and/or voltage, the value $P_{oL}$ of the total power output by the POL converters while the intermediate bus voltage is set to $V_{IBL}$ is calculated using the received values of the currents and/or voltages output by the POL converters, and the second value $P_{dL}$ for the system power loss is calculated using $P_{dL} = P_{iL} - P_{oL}$.

In step S80, the control signal generator 770 generates a control signal instructing the IBC 200 to increment the intermediate bus voltage to a second changed value $V_{IBH} = V_{IB0} + \Delta V_{IB}$. The generated control signal is communicated to the IBC 200 via the PMBus 800, causing the IBC to change the intermediate bus voltage to the value $V_{IBH}$.

In step S90, the voltage controller 700 transmits information requests to the IBC and the POL's via the PMBus. The receiving section 710 then receives from the IBC the values of the input power bus voltage $V_{DCH}$ and the current $I_{DCH}$ input to the IBC. The receiving section also receives the values of the current and voltage output by each of the POL converters, i.e. $V_{o1}, I_{o1}, V_{o2}, I_{o2}, \ldots V_{oK}, I_{oK}$. Although the receiving section 710 receives both the current and voltage values from the IBC 200 and each of the POL converters 500-1 to 500-K in the present embodiment, as in steps S30 and S60, the receiving section may alternatively receive only the current values from the IBC and one or more of the POL converters. In this case, the values for the respective voltages may be stored by the voltage controller (e.g. in instruction store 740) for use in the power loss calculations which are performed by the efficiency measuring unit 770.

In step S100, the efficiency measuring unit 770 calculates a third value $P_{dH}$ for the system power loss, which corresponds to the power loss associated with the second changed value of the intermediate bus voltage, $V_{IBH}$. The third power loss value $P_{dH}$ is calculated by the efficiency measuring unit 770 by the same process as used in steps S40 and S70.

In step S110, the efficiency measuring unit evaluates whether the second power loss value $P_{dL}$ is smaller than the first power loss value $P_d$. If $P_{dL} < P_d$, then the control signal generator generates control signals for instructing the IBC 200 to set the intermediate bus voltage to the value $V_{IBL}$. However, if the second power loss value $P_{dL}$ is not smaller than the first power loss value $P_d$, the efficiency measuring unit evaluates whether the third power loss value $P_{dH}$ is smaller than the first power loss value $P_d$. If $P_{dH} < P_d$, then the control signal generator generates control signals for instructing the IBC 200 to set the intermediate bus voltage to the value $V_{IBH}$. Of course, if the intermediate bus voltage is already set at $V_{IBH}$, the control signal generator need not generate the control signals. On the other hand, if the efficiency measuring unit determines that both the second and third power loss values, $P_{dL}$ and $P_{dH}$, are greater than the first power loss value $P_d$, then the control signal generator generates control signals to cause the IBC 200 to set the intermediate bus voltage to the value $V_{IB0}$.

The control signals generated by the control signal generator 770 are then transmitted to the IBC 200 via the PMBus 800, and the IBC sets or adjusts as necessary the value of $V_{IB}$ in accordance with the received control signals such that the power loss in the IBA power system is reduced or at least kept in the proximity of its optimal value. Naturally, if as a result of the evaluation at step S110 it is determined that the value of $V_{IB}$ currently being output by the IBC provides the lowest power loss, then no control signal need be generated or transmitted to the IBC following the evaluation step.

Steps S30 to S110 are then repeated following a time delay of duration $t_d$ in step S120. The interval $t_d$ may simply be fixed, for example at a value in the range of 1 ms to 10 s. However, the power consumed by the voltage controller in implementing the processing operations of FIG. 4 and by the communication between the voltage controller, IBC and the POL converters must be weighed against the efficiency gains achieved by the IBV tuning. For this reason, it is preferable that $t_d$ is varied by the voltage controller in dependence upon the load time constants, in other words, with the rates at which the POL converter loads are expected, or found through measurement, to change. For example, $t_d$ may be set to a smaller value during the day than at night, when the load conditions are expected to be largely invariant and the efficiency gains derived from IBV tuning more limited.

By the iterative process illustrated in FIG. 4, the intermediate bus voltage can be tuned by the IBC under control of the voltage controller towards the value which provides the highest system efficiency and is subsequently maintained in the proximity of the optimal value as this value changes with varying output load conditions.

Second Embodiment

A second embodiment of the present invention will now be described with reference to FIG. 5. The components of the second embodiment are the same as those in the first embodiment described above. Accordingly, these components will not be described again here. However, the processing operations performed by the components are different, and these processing operations will now be described.

Figure 5:
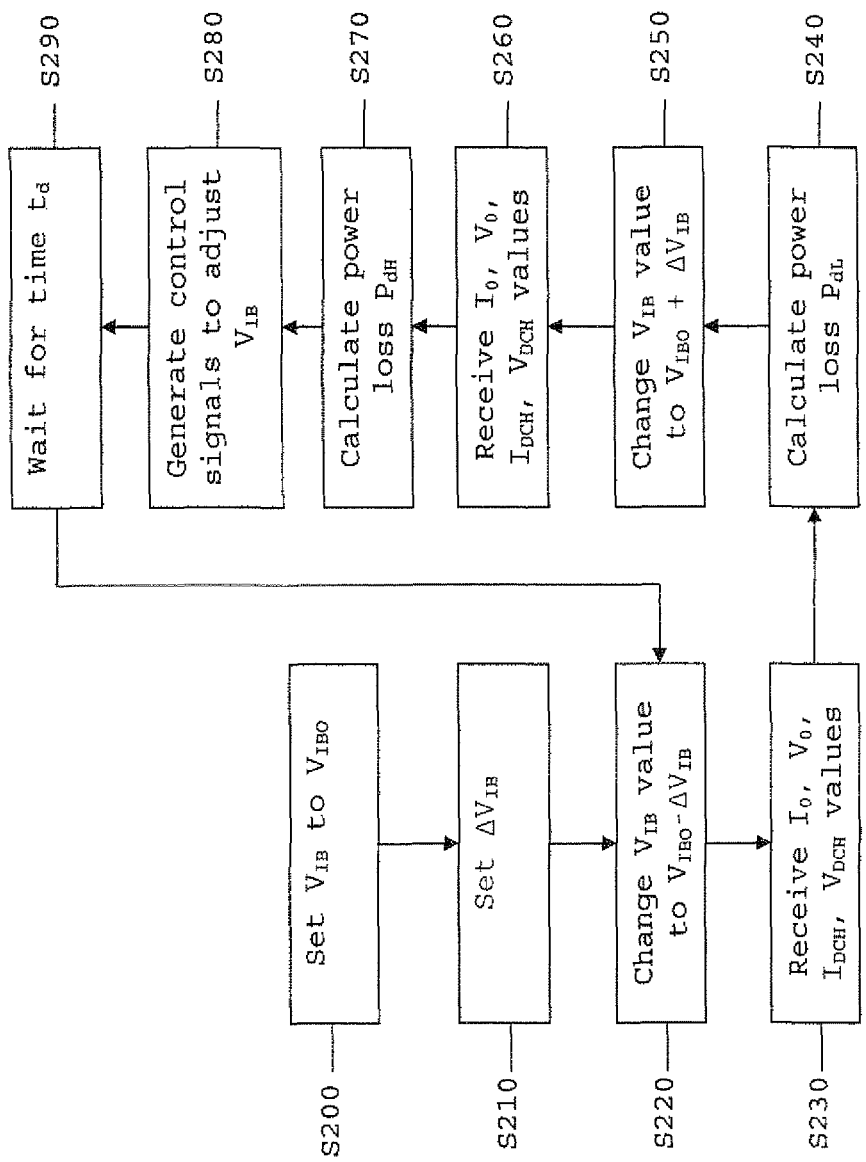
FIG. 5 is a flow diagram illustrating a method of controlling the intermediate bus voltage in the second embodiment.

FIG. 5 is a flow diagram illustrating the operations performed by the voltage controller 700 in the second embodiment. The process begins with step S200, where during start-up of the IBA power system the control signal generator 770 of the voltage controller 700 sets the intermediate bus voltage $V_{IB}$ to an initial value $V_{IB0}$, which is selected to ensure safe operation.

At step S210, the efficiency measuring unit 770 sets an intermediate bus voltage step size $\Delta V_{IB}$ to a value which may correspond to a default value stored in memory 740 or which may be selected by the efficiency measuring unit from a plurality of stored values.

In step S220, the control signal generator 770 generates a control signal instructing the IBC 200 to decrement the intermediate bus voltage from its current value $V_{IB0}$ to a first changed value $V_{IBL}=V_{IB0}-\Delta V_{IB}$. The generated control signal is communicated to the IBC 200 via the PMBus 800, causing the IBC to change the intermediate bus voltage from $V_{IB0}$ to the value $V_{IBL}$.

In step S230, the voltage controller 700 transmits information requests to the IBC 200 and the POL converters 500-1 to 500-K via the PMBus 800. The receiving section 710 then receives from the IBC the values of the input power bus voltage $V_{DCH}$ and the current $I_{DCH}$ input to the IBC 200. The receiving section also receives the values of the current and voltage output by each of the POL converters, i.e. $V_{o1}$, $I_{o1}$, $V_{o2}$, $I_{o2}$, ... $V_{oK}$, $I_{oK}$. Although the receiving section 710 receives both the current and voltage values from the IBC 200 and each of the POL converters 500-1 to 500-K in the present embodiment, the receiving section may alternatively receive only the current values from the IBC and/or one or more of the POL converters, as explained in connection with the process of FIG. 4.

In step S240, the efficiency measuring unit 770 calculates a first value $P_{dL}$ for the system power loss, which corresponds to the power loss associated with the first changed value of the intermediate bus voltage, $V_{IBL}$. The first power loss value $P_{dL}$ is calculated by the efficiency measuring unit 770 by the same process as used in steps S40, S70 and S100 of the flow chart of FIG. 4.

In step S250, the control signal generator 770 generates a control signal instructing the IBC 200 to increment the intermediate bus voltage to a second changed value $V_{IBH}=V_{IB0}+\Delta V_{IB}$. The generated control signal is communicated to the IBC 200 via the PMBus 800, causing the IBC to change the intermediate bus voltage to the value $V_{IBH}$.

In step S260, the voltage controller 700 transmits information requests to the IBC and the POL converters via the PMBus 800. The receiving section 710 then receives from the IBC the values of the input power bus voltage $V_{DCH}$ and the current $I_{DCH}$ input to the IBC 200. The receiving section also receives the values of the current and voltage output by each of the POL converters, i.e. $V_{o1}$, $I_{o1}$, $V_{o2}$, $I_{o2}$, ... $V_{oK}$, $I_{oK}$. Although the receiving section 710 receives both the current and voltage values from the IBC 200 and each of the POL converters 500-1 to 500-K in the present embodiment, the receiving section may alternatively receive only the current values from the IBC and/or one or more of the POL converters, as explained in connection with the process of FIG. 4.

In step S270, the efficiency measuring unit 770 calculates a second value $P_{dH}$ for the system power loss, which corresponds to the power loss associated with the second changed value of the intermediate bus voltage, $V_{IBH}$. The second power loss value $P_{dH}$ is calculated by the efficiency measuring unit 770 by the same process as used in steps S40, S70 and S100 of the flow chart of FIG. 4.

In step S280, the efficiency measuring unit evaluates whether the first power loss value $P_{dL}$ is smaller than the second power loss value $P_{dH}$. If $P_{dL}<P_{dH}$, the control signal generator generates control signals for causing the IBC 200 to set the intermediate bus voltage to the value $V_{IBL}$. However, if the first power loss value $P_{dL}$ is not smaller than the second power loss value $P_{dH}$, the control signal generator generates control signals for causing the IBC 200 to set the intermediate bus voltage to the value $V_{IBH}$. Of course, if the intermediate bus voltage is already set at $V_{IBH}$, the control signal generator need not generate the control signal.

The control signals generated by the control signal generator 770 are then transmitted to the IBC 200 via the PMBus 800, and the IBC sets the value of $V_{IB}$ in accordance with the received control signals such that the power loss in the IBA power system is reduced or at least kept in the proximity of its optimal value. Naturally, if as a result of the evaluation at step S280 it is determined that the value of $V_{IB}$ currently being output by the IBC provides the lower of the calculated power losses, then no control signal need be generated or transmitted to the IBC following the evaluation step S280.

Steps S220 to S290 are then repeated following a time delay of duration $t_d$ in step S290. As in the example of FIG. 4, the interval $t_d$ may be fixed or variable.

By the iterative process illustrated in FIG. 5, the intermediate bus voltage is tuned by the IBC under control of the voltage controller towards the value which provides the highest system efficiency and is subsequently maintained in the proximity of the optimal value as this value changes with varying output load conditions. It will be appreciated that since the process of FIG. 5 requires only two steps of receiving IBC and POL voltage and current values (steps S230 and S260) and only two power loss calculations (S240 and S270) per iteration, it allows the intermediate bus voltage to be tuned in an efficient manner.

Third Embodiment

A third embodiment of the present invention will now be described with reference to FIG. 6. The components of the third embodiment are the same as those in the first embodiment described above. Accordingly, these components will not be described again here. However, the processing operations performed by the components are different, and these processing operations will now be described.

The process described with reference to FIG. 4 may be simplified by omitting the reception of values of the current ($I_{o1}$, $I_{o2}$, ... $I_{oK}$) and/or voltage ($V_{o1}$, $V_{o2}$, ... $V_{oK}$) output by each of the second stage DC/DC converters (500-1 to 500-K) in steps S30, S60 and S90 in FIG. 4, and simply calculating the power input to the first stage DC/DC converter 200 (i.e. $V_{DCH} \cdot I_{DCH}$) in steps S40, S70 and S100 instead of the power loss in the system. This simplification may be used where the power output to the loads 600-1 to 600-K by the second stage DC/DC converters is independent of the set value of the intermediate bus voltage and thus need not be taken into account in the calculations performed by the efficiency measuring unit 770. Thus, in the present embodiment, the power input to the IBA power system provides a measure of the efficiency of the IBA power system. Since the number of data reception and calculation operations is significantly reduced in comparison with the process of FIG. 4, this modification greatly improves the speed with which the intermediate bus voltage can be regulated.

Figure 6:
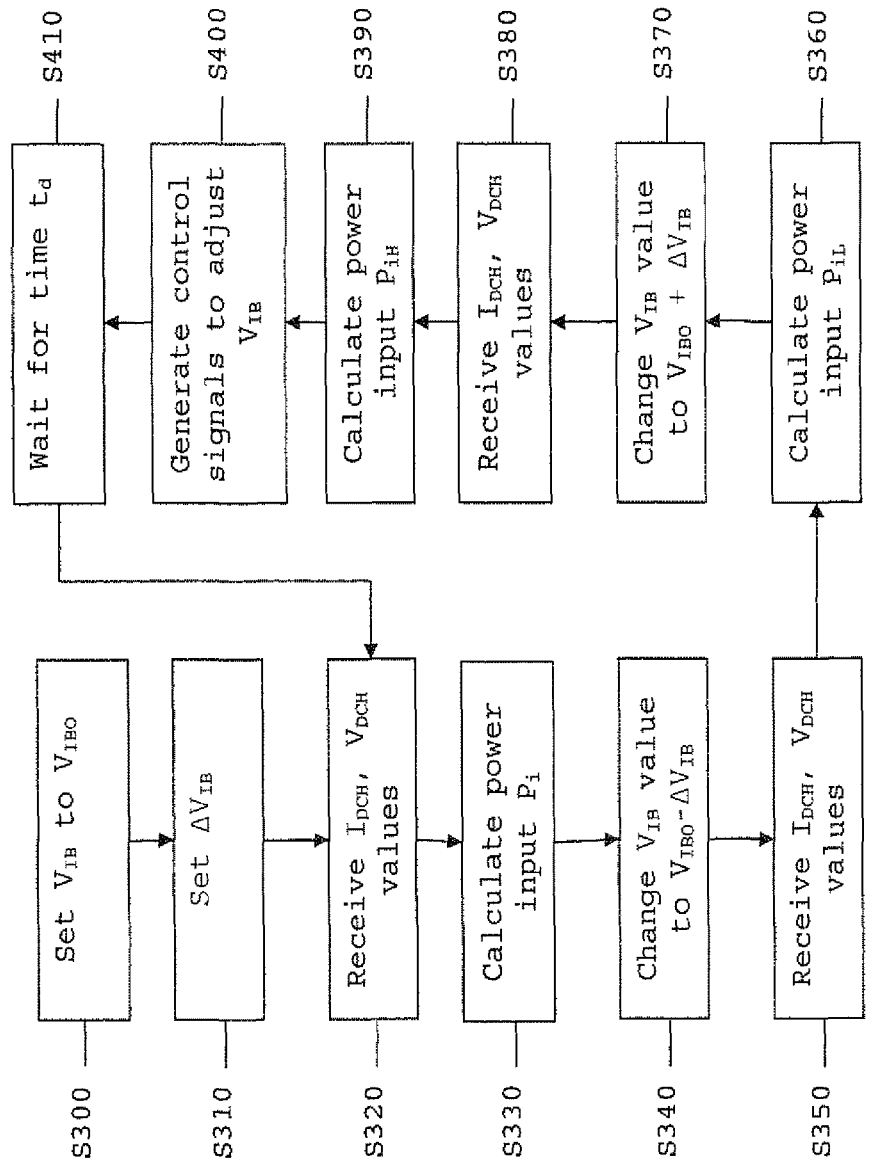
FIG. 6 is a flow chart illustrating a method of controlling the intermediate bus voltage in a third embodiment.

Such a modification of the process of FIG. 4 is shown in the flow diagram of FIG. 6, which illustrates the processing operations performed by the above-described voltage controller 700 in the third embodiment to generate control signals by which the IBC 200 can adjust the intermediate bus voltage $V_{IB}$.

Referring to FIG. 6, steps S300 and S310 correspond to steps S10 and S20 in FIG. 4 and will therefore not be described again.

At step S320, the voltage controller 700 issues an information request signal to the IBC 200 via the PMBus 800. The receiving section 710 of the voltage controller 700 then receives from the IBC via the PMBus 800 the values of the input power bus voltage $V_{DCH}$ and the current $I_{DCH}$ input to the IBC 200. Although the receiving section 710 receives both the current and voltage values from the IBC 200 in the present embodiment, the receiving section may alternatively receive only the current values from the IBC. In this case, the values for the respective voltages may be stored by the voltage controller (e.g. in instruction store 740) for use in the input power calculations which are performed by the efficiency measuring unit 770 in step S330, S360 and S390.

In step S330, the efficiency measuring unit 770 calculates a first value $P_i$ for the system input power, which corresponds to the input power associated with the presently set value of the intermediate bus voltage, which at this stage is $V_{IB0}$. The power input calculation is performed using the received values of the input current and voltage, $I_{DCH}$ and $V_{DCH}$ (or a received value of either $I_{DCH}$ or $V_{DCH}$ together with a stored value of the remaining parameter). In other words, the efficiency measuring unit calculates the input power $P_i$, as given by $P_i = V_{DCH} \cdot I_{DCH}$.

In step S340, the control signal generator 770 generates a control signal instructing the IBC 200 to decrement the intermediate bus voltage from its current value $V_{IB0}$ to a first changed value $V_{IBL} = V_{IB0} - \Delta V_{IB}$. The generated control signal is communicated to the IBC 200 via the PMBus 800, causing the IBC to change the intermediate bus voltage from $V_{IB0}$ to the value $V_{IBL}$.

In step S350, the voltage controller 700 transmits an information request to the IBC via the PMBus 800. The receiving section 710 then receives from the IBC 200 the values of the input power bus voltage $V_{DCH}$ and the current $I_{DCH}$ input to the IBC. Although the receiving section 710 receives both the current and voltage values from the IBC 200 in the present embodiment, as in step S320, the receiving section may alternatively receive only the current values from the IBC. In this case, the values for the respective voltages may be stored by the voltage controller (e.g. in instruction store 740) for use in the power input calculations which are performed by the efficiency measuring unit 770.

In step S360, the efficiency measuring unit 770 calculates a second value $P_{iL}$ for the system input power, which corresponds to the input power associated with the first changed value of the intermediate bus voltage, $V_{IBL}$. The second input power value $P_{iL}$ is calculated by the efficiency measuring unit 770 by the same process as used in step S330.

In step S370, the control signal generator 770 generates a control signal instructing the IBC 200 to increment the intermediate bus voltage to a second changed value $V_{IBH} = V_{IB0} + \Delta V_{IB}$. The generated control signal is communicated to the IBC 200 via the PMBus 800, causing the IBC to change the intermediate bus voltage to the value $V_{IBH}$.

In step S380, the voltage controller 700 transmits an information request to the IBC via the PMBus. The receiving section 710 then receives from the IBC the values of the input power bus voltage $V_{DCH}$ and the current $I_{DCH}$ input to the IBC. Although the receiving section 710 receives both the current and voltage values from the IBC 200 in the present embodiment, as in steps S320 and S350, the receiving section may alternatively receive only the current values from the IBC. In this case, the values for the respective voltages may be stored by the voltage controller (e.g. in instruction store 740) for use in the input power calculations which are performed by the efficiency measuring unit 770.

In step S390, the efficiency measuring unit 770 calculates a third value $P_{iH}$ for the system input power, which corresponds to the input power associated with the second changed value of the intermediate bus voltage, $V_{IBH}$. The third input power value $P_{iH}$ is calculated by the efficiency measuring unit 770 by the same process as used in steps S330 and S360.

In step S400, the efficiency measuring unit evaluates whether the second input power value $P_{iL}$ is smaller than the first input power value $P_i$. If $P_{iL} < P_i$, then the control signal generator generates control signals for instructing the IBC 200 to set the intermediate bus voltage to the value $V_{IBL}$. However, if the second input power value $P_{iL}$ is not smaller than the first input power value $P_i$, the efficiency measuring unit evaluates whether the third input power value $P_{iH}$ is smaller than the first input power value $P_i$. If $P_{iH} < P_i$, then the control signal generator generates control signals for instructing the IBC 200 to set the intermediate bus voltage to the value $V_{IBH}$. Of course, if the intermediate bus voltage is already set at $V_{IBH}$, the control signal generator need not generate the control signals. On the other hand, if the efficiency measuring unit determines that both the second and third input power values, $P_{iL}$ and $P_{iH}$, are greater than the first input power value $P_i$, then the control signal generator generates control signals to cause the IBC 200 to set the intermediate bus voltage to the value $V_{IB0}$.

The control signals generated by the control signal generator 770 are then transmitted to the IBC 200 via the PMBus 800, and the IBC sets or adjusts as necessary the value of $V_{IB}$ in accordance with the received control signals such that the efficiency of the IBA power system is improved or at least kept in the proximity of its optimal value. Naturally, if as a result of the evaluation at step S400 it is determined that the value of $V_{IB}$ currently being output by the IBC provides the lowest input power, hence the highest system efficiency, then no control signal need be generated or transmitted to the IBC following the evaluation step.

Steps S320 to S400 are then repeated following a time delay of duration $t_d$ in step S410. The interval $t_d$ may be fixed or variable, as explained above in connection with the first and second embodiments.

By the iterative process illustrated in FIG. 6, the intermediate bus voltage can be tuned by the IBC under control of the voltage controller towards the value which provides the highest system efficiency and is subsequently maintained in the proximity of the optimal value as this value changes with varying output load conditions.

Fourth Embodiment

A fourth embodiment of the present invention will now be described with reference to FIG. 7. The components of the fourth embodiment are the same as those in the embodiments described above. Accordingly, these components will not be described again here. However, the processing operations performed by the components are different, and these processing operations will now be described.

The process described with reference to FIG. 5 may be simplified by omitting the reception of values of the current ($I_{o1}$, $I_{o2}$, ... $I_{oK}$) and/or voltage ($V_{o1}$, $V_{o2}$, ... $V_{oK}$) output by each of the second stage DC/DC converters (500-1 to 500-K) in steps S230 and S260, and simply calculating, as the measure of the efficiency of the IBA power system, the power input to the first stage DC/DC converter 200 (i.e. $V_{DCH} \cdot I_{DCH}$) in steps S240 and S270 instead of the power loss in the system. This simplification may be used where the power output to the loads 600-1 to 600-K by the second stage DC/DC converters is independent of the set value of the intermediate bus voltage and thus need not be taken into account in the calculations performed by the efficiency measuring unit 770. Since the number of data reception and calculation operations is thus significantly reduced, this modification greatly improves the speed with which the intermediate bus voltage can be regulated.

Figure 7:
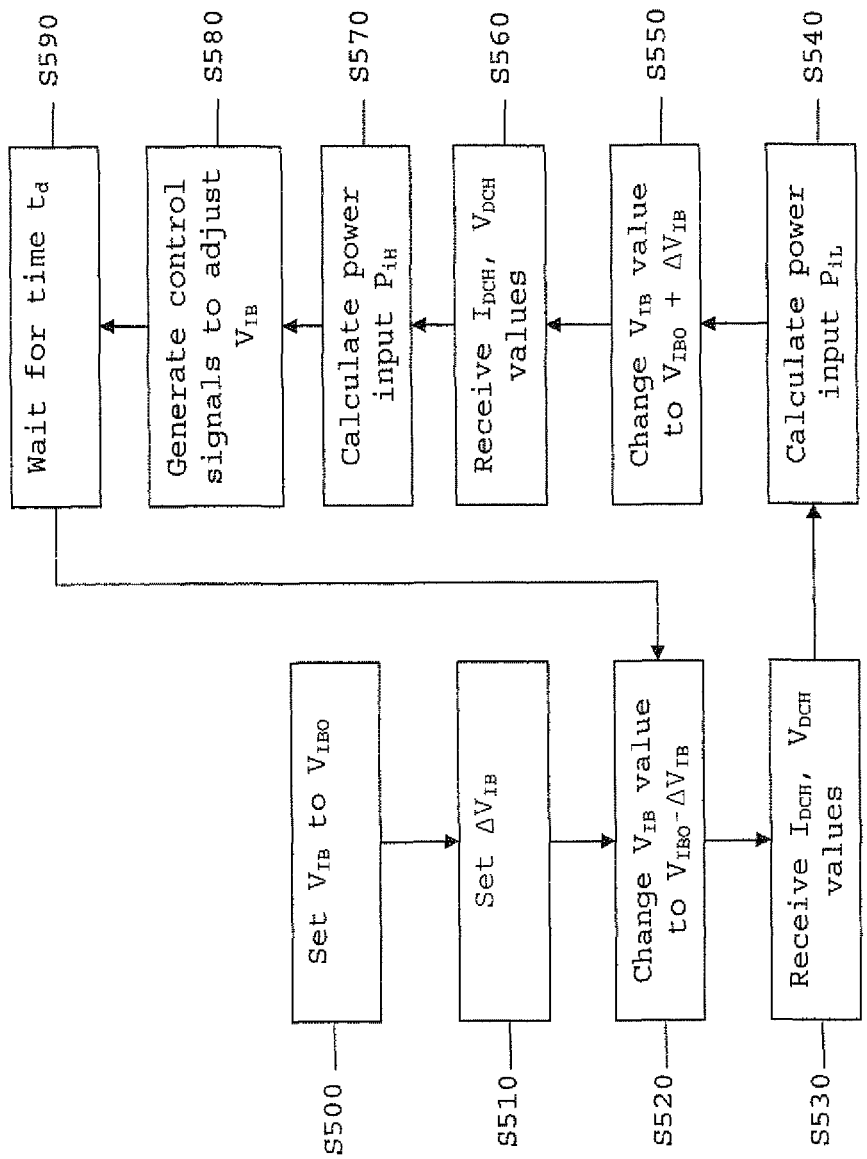
FIG. 7 is a flow chart illustrating a method of controlling the intermediate bus voltage in a fourth embodiment.

Such modifications of the process of FIG. 5 are shown in the flow diagrams of FIG. 7, which illustrates the processing operations performed by the above-described voltage controller 700 in the fourth embodiment to generate control signals by which the IBC 200 can adjust the intermediate bus voltage $V_{IB}$.

In FIG. 7, steps S500 and S510 correspond to steps S200 and S210 of FIG. 5, respectively. In step S520, the control signal generator 770 generates a control signal instructing the IBC 200 to decrement the intermediate bus voltage from its current value $V_{IB0}$ to a first changed value $V_{IBL} = V_{IB0} - \Delta V_{IB}$. The generated control signal is communicated to the IBC 200 via the PMBus 800, causing the IBC to change the intermediate bus voltage from $V_{IB0}$ to the value $V_{IBL}$.

In step S530, the voltage controller 700 transmits an information request to the IBC 200 via the PMBus 800. The receiving section 710 then receives from the IBC the values of the input power bus voltage $V_{DCH}$ and the current $I_{DCH}$ input to the IBC 200. Although the receiving section 710 receives both the current and voltage values from the IBC 200 in the present embodiment, the receiving section may alternatively receive only the current values from the IBC, as explained in connection with the process of FIG. 6.

In step S540, the efficiency measuring unit 770 calculates a first value $P_{iL}$ for the system input power, which corresponds to the input power associated with the first changed value of the intermediate bus voltage, $V_{IBL}$. The first power input value $P_{iL}$ is calculated by the efficiency measuring unit 770 in the same way as in steps S330, S360 and S390 of the flow chart of FIG. 6.

In step S550, the control signal generator 770 generates a control signal instructing the IBC 200 to increment the intermediate bus voltage to a second changed value $V_{IBH} = V_{IB0} + \Delta V_{IB}$. The generated control signal is communicated to the IBC 200 via the PMBus 800, causing the IBC to change the intermediate bus voltage to the value $V_{IBH}$.

In step S560, the voltage controller 700 transmits an information request to the IBC via the PMBus 800. The receiving section 710 then receives from the IBC the values of the input power bus voltage $V_{DCH}$ and the current $I_{DCH}$ input to the IBC 200. Although the receiving section 710 receives both the current and voltage values from the IBC 200 in the present embodiment, the receiving section may alternatively receive only the current values from the IBC, as explained in connection with the process of FIG. 6.

In step S570, the efficiency measuring unit 770 calculates a second value $P_{iH}$ for the system input power, which corresponds to the input power associated with the second changed value of the intermediate bus voltage, $V_{IBH}$.

In Step S580, the efficiency measuring unit evaluates whether the first input power value $P_{iL}$ is smaller than the second input power value $P_{iH}$. If $P_{iL} < P_{iH}$, the control signal generator generates control signals for causing the IBC 200 to set the intermediate bus voltage to the value $V_{IBL}$. However, if the first input power value $P_{iL}$ is not smaller than the second input power value $P_{iH}$, the control signal generator generates control signals for causing the IBC 200 to set the intermediate bus voltage to the value $V_{IBH}$. Of course, if the intermediate bus voltage is already set at $V_{IBH}$, the control signal generator need not generate the control signal.

The control signals generated by the control signal generator 770 are then transmitted to the IBC 200 via the PMBus 800, and the IBC sets the value of $V_{IB}$ in accordance with the received control signals such that the power efficiency of the IBA power system is improved or at least kept in the proximity of its optimal value. Naturally, if as a result of the evaluation at step S580 it is determined that the value of $V_{IB}$ currently being output by the IBC provides the lower of the calculated input powers, then no control signal need be generated or transmitted to the IBC following the evaluation step.

Steps S520 to S590 are then repeated following a time delay of duration $t_d$ in step S290. As in the example of FIG. 6, the interval $t_d$ may be fixed or variable.

By the iterative process illustrated in FIG. 7, the intermediate bus voltage is tuned by the IBC under control of the voltage controller towards the value which provides the highest system efficiency and is subsequently maintained in the proximity of the optimal value as this value changes with varying output load conditions. It will be appreciated that since the process of FIG. 7 requires only two steps of receiving IBC voltage and current values (steps S530 and S560) and only two input power calculations (S540 and S570) per iteration, it allows the intermediate bus voltage to be tuned in an efficient manner.

[Modifications and Variations]

Many modifications and variations can be made to the embodiments described above.

For example, where the process of FIG. 4, 5, 6 or 7 leads to the intermediate bus voltage being regulated down to a low level, the situation may arise that the current needs suddenly become larger than the system can handle at this low IBV level. In these circumstances, it is desirable to quickly increase the value of $V_{IB}$ to the safe, nominal level $V_{IB0}$. Thus it is preferable for the efficiency measuring unit 770 to also function as a current monitor to monitor whether the current input to the IBC 200, $I_{DCH}$, has exceeded a threshold value $I_{DCHT}$ and, when it has, to generate control signals to cause the intermediate bus voltage to be set to $V_{IB0}$. For example, the efficiency measuring unit 770 may compare the received value of $I_{DCH}$ against the threshold value $I_{DCHT}$ in one or more of steps S30, S60, S90, S230 and S260 (or the corresponding steps in FIGS. 6 and 7) and, if the threshold value is determined to have been exceeded, the control signal generator generates control signals for causing the intermediate bus voltage to be set to the predetermined value $V_{IB0}$.

In order to ensure that the process of FIG. 4, 5, 6 or 7 does not lead to the intermediate bus voltage being tuned to a value that it too high for the input voltage range of any of the POL converters 500-1 to 500-K, it is preferable for the arrangement 770 to also function as a IBV monitor that monitors the control signals generated by the control signal generator and prevents control signals that would cause the IBV to be increased beyond a pre-determined threshold from being transmitted to the IBC 200.

In the embodiments described above the functions of the efficiency measuring unit and the control signal generator are provided by a programmable processing apparatus having a processor 720 which performs the power loss calculation and control signal generation operations in accordance with software instructions stored in instructions store 740. However, it will be appreciated that one or both of the efficiency measuring unit and the control signal generator may be configured otherwise. For example, the voltage controller may comprise non-programmable hardware (e.g. an ASIC) that is dedicated to serving the functions of the efficiency measuring unit and the control signal generator.

Although the IBC 200 and the POL regulators 500-1 to 500-K are buck regulators in the above embodiments, their topology is not limited to such and may alternatively be Boost, Buck-Boost etc.

It will also be appreciated that the order of some of the steps in FIGS. 4 to 7 may be performed in a different order or in parallel. For example, the series of steps S50-S70 in FIG. 4 may be interchanged with the series of steps S80-S100. Furthermore, two or more of the power loss calculations in steps S40, S70 and S100 may be performed in parallel. Similar modifications may be applied to the processes of FIGS. 5, 6 and 7.

In the above embodiments, the power loss in the IBA power system and the power input to the system provide convenient measures of the efficiency of the system. However, any other suitable of desirable efficiency measure can be used. For example, in the processes of FIGS. 4 and 5, the efficiency measuring unit 770 may alternatively calculate in steps S40, S70, S100, S240 and S270 a ratio between the power input to the IBA power system (i.e. the power input to the IBC 200, $I_{DCH}V_{DCH}$) and the power output by the system (e.g. the power output by all of the POI, regulators, as given by Eqn. 1). As a further example of an efficiency measure, the efficiency measuring unit 770 may calculate the efficiency measure as $1-P_{loss}/P_{in}$ or $(1-P_{loss}/P_{in}) \cdot 100$, where $P_{loss}$ is the power loss and $P_{in}$ is the input power.

It should be noted, however, that an efficiency measure in the form of the power loss in the system has the advantage of being fast to compute because its computation avoids the computationally more demanding operation of division.

Furthermore, in the third and fourth embodiments described above, the voltage controller 700 generates control signals on the basis of calculations of values of the power input to the IBA power system that are performed by the efficiency measuring unit 770. However, the efficiency measuring unit 770 may, instead of calculating the input power values, function as a current comparator by determining and comparing values of the current input to the IBC 200, the input current providing a convenient measure of the system efficiency where the input bus voltage $V_{DCH}$ does not fluctuate significantly with time.

The invention claimed is:

1. A voltage controller operable to generate control signals for controlling an intermediate bus voltage (VIB) in an intermediate bus architecture power system, the intermediate bus voltage comprising a voltage output from a first stage DC-to-DC power converter to at least one second stage DC-to-DC power converter via the intermediate voltage bus in the intermediate bus architecture power system, the voltage controller comprising:
   a receiver operable to receive, in a first iteration and a second iteration subsequent to the first iteration, at least one of voltage and current values input to the first stage DC-to-DC power converter;
   an efficiency measuring unit operable to determine a measure of an efficiency of the intermediate bus architecture power system in accordance with the received values by:
   (i) determining a first value of the efficiency measure using the received values from the first iteration corresponding to a first intermediate bus voltage (VIB) that has been incremented from an initial value to a first predetermined value,
   (ii) determining a second value of the efficiency measure using the received values from the second iteration corresponding to a second, different intermediate bus voltage (VIB) that has been decremented from the initial value to a second predetermined value, and
   (iii) determining which of the first and second values of efficiency measure represents a higher system efficiency; and
   a control signal generator operable to generate control signals in dependence upon the determined first and second efficiency measure values to cause the first stage DC-to-DC converter to set the intermediate bus voltage (VIB) to a value corresponding to the first or second value of efficiency measure depending on which of said first and second values was determined to represent the higher system efficiency, wherein
   the efficiency measuring unit and the control signal generator are operable to:
   (i) repeat the efficiency measure determination and the setting of the intermediate bus voltage (VIB) at prescribed time intervals, and
   (ii) change the time intervals in dependence upon changes in one or more loads of the intermediate bus architecture power system.

2. The voltage controller according to claim 1, wherein:
   the efficiency measuring unit is operable to: determine a first value of a power input to the intermediate bus architecture power system, as said first efficiency measure value, using the received values corresponding to the first intermediate bus voltage (VIB); and determine a second value of the input power, as said second efficiency measure value, using the received values corresponding to the second, different intermediate bus voltage (VIB); and
   the control signal generator is operable to generate, in dependence on the first and second input power values, control signals to cause the intermediate bus voltage to be set to the value corresponding to the lower of the first and second input power values.

3. The voltage controller according to claim 1, wherein:
the receiver is further operable to receive at least one of voltage and current values output by each second stage DC-to-DC power converter;
the efficiency measuring unit is operable to: calculate a first value of a power loss in the intermediate bus architecture power system, as said first efficiency measure value, using the received values corresponding to the first intermediate bus voltage (VIB); and calculate a second value of the power loss, as said second efficiency measure value, using the received values corresponding to the second, different intermediate bus voltage (VIB); and
the control signal generator is operable to generate, in dependence on the first and second power loss values, control signals to cause the intermediate bus voltage to be set to the value corresponding to the lower of the first and second power loss values.

4. The voltage controller according to claim 1, wherein:
the receiver is further operable to receive at least one of voltage and current values output by each second stage DC-to-DC power converter;
the efficiency measuring unit is operable to: calculate a first value of a ratio between a power input to the intermediate bus architecture power system and a power output thereby, as said first efficiency measure value, using the received values corresponding to the first intermediate bus voltage (VIB); and calculate a second value of said ratio, as said second efficiency measure value, using the received values corresponding to the second, different intermediate bus voltage (VIB); and
the control signal generator is operable to generate, in dependence on the first and second ratio values, control signals to cause the intermediate bus voltage to be set to the value corresponding to the first or second ratio value representing a higher system efficiency.

5. The voltage controller according to claim 1, wherein:
the efficiency measuring unit is operable to determine a third value of the efficiency measure using the received values corresponding to the initial value of the intermediate bus voltage (VIB); and
the control signal generator is operable to generate, in dependence on the determined efficiency measure values, control signals to cause the intermediate bus voltage (VIB) to be set to the changed value corresponding to the first or second efficiency measure value representing a higher system efficiency, if the higher system efficiency is greater than a system efficiency represented by the third efficiency measure value.

6. The voltage controller according to claim 1, wherein:
the receiver is arranged to receive a value of the current input to the first stage DC-to-DC power converter; and
the voltage controller further comprises a current monitor operable to determine whether the value of the current input to the first stage DC-to-DC power converter has exceeded a threshold, and operable, when the current has exceeded the threshold, to cause the control signal generator to generate control signals to set the intermediate bus voltage (VIB) to a predetermined value.

7. An intermediate bus architecture power system having a voltage controller according to claim 1.

8. A method of generating control signals for controlling an intermediate bus voltage (VIB) in an intermediate bus architecture power system, the intermediate bus voltage comprising a voltage output from a first stage DC-to-DC power converter to at least one second stage DC-to-DC power converter via the intermediate voltage bus in the intermediate bus architecture power system, the method comprising:
receiving, in a first iteration and a second iteration subsequent to the first iteration, at least one of voltage and current values input to the first stage DC-to-DC power converter;
determining a measure of an efficiency of the intermediate bus architecture power system in accordance with the received values by:
(i) determining a first value of the efficiency measure using the received values from the first iteration corresponding to a first intermediate bus voltage (VIB) that has been incremented from an initial value to a first predetermined value,
(ii) determining a second value of the efficiency measure using the received values from the second iteration corresponding to a second, different intermediate bus voltage (VIB) that has been decremented from the initial value to a second predetermined value, and
(iii) determining which of the first and second values of efficiency measure represents a higher system efficiency;
generating control signals in dependence upon the determined first and second efficiency measure values to cause the first stage DC-to-DC converter to set the intermediate bus voltage (VIB) to a value corresponding to the first or second value of efficiency measure depending on which of said first and second values was determined to represent the higher system efficiency;
repeating the efficiency measure determination and the setting of the intermediate bus voltage (VIB) at prescribed time intervals; and
changing the time intervals in dependence upon changes in one or more loads of the intermediate bus architecture power system.

9. The method according to claim 8, wherein:
determining the efficiency measure comprises: determining a first value of a power input to the intermediate bus architecture power system, as said first efficiency measure value, using the received values corresponding to the first intermediate bus voltage (VIB); and determining a second value of the input power, as said second efficiency measure value, using the received values corresponding to the second, different intermediate bus voltage (VIB); and
generating the control signals comprises generating, in dependence on the first and second input power values, control signals to cause the intermediate bus voltage to be set to the value corresponding to the lower of the first and second input power values.

10. The method according to claim 8, wherein:
in the receiving process, at least one of voltage and current values output by each second stage DC-to-DC power converter are also received;
determining the efficiency measure comprises: calculating a first value of a power loss in the intermediate bus architecture power system, as said first efficiency measure value, using the received values corresponding to the first intermediate bus voltage (VIB); and calculating a second value of the power loss, as said second efficiency measure value, using the received values corresponding to the second, different intermediate bus voltage (VIB); and generating the control signals comprises generating, in dependence on the first and second power loss values, control signals to cause the intermediate bus voltage to be set to the value corresponding to the lower of the first and second power loss values.

11. The method according to claim 8, wherein:
in the receiving process, at least one of voltage and current values output by each second stage DC-to-DC power converter are also received;
determining the efficiency measure comprises: calculating a first value of a ratio between a power input to the intermediate bus architecture power system and a power output thereby, as said first efficiency measure value, using the received values corresponding to the first intermediate bus voltage (VIB); and calculating a second value of said ratio, as said second efficiency measure value, using the received values corresponding to the second, different intermediate bus voltage (VIB); and
generating the control signals comprises generating, in dependence on the first and second ratio values, control signals to cause the intermediate bus voltage to be set to the value corresponding to the first or second ratio value representing a higher system efficiency.

12. The method according to claim 8, wherein:
determining the efficiency measure comprises: determining a third value of the efficiency measure using the received values corresponding to the initial value of the intermediate bus voltage (VIB); and
generating the control signals comprises generating, in dependence on the determined efficiency measure values, control signals to cause the intermediate bus voltage (VIB) to be set to the predetermined value corresponding to the first or second efficiency measure value representing a higher system efficiency, if the higher system efficiency is greater than a system efficiency represented by the third efficiency measure value.

13. The method according to claim 8, wherein a value of the current input to the first stage DC-to-DC power converter is received, and the method further comprises: monitoring the current input to the first stage DC-to-DC converter to determine whether the value of said current has exceeded a threshold, and when the current has exceeded the threshold, generating control signals to set the intermediate bus voltage (VIB) to a predetermined value.

14. A non-transitory computer-readable storage medium storing computer program instructions which, when executed by a processor, cause the processor to perform a method comprising:
receiving, in a first iteration and a second iteration subsequent to the first iteration, at least one of voltage and current values input to a first stage DC-to-DC power converter;
determining a measure of an efficiency of an intermediate bus architecture power system in accordance with the received values by:
(i) determining a first value of the efficiency measure using the received values from the first iteration corresponding to a first intermediate bus voltage (VIB) that has been incremented from an initial value to a first predetermined value,
(ii) determining a second value of the efficiency measure using the received values from the second iteration corresponding to a second, different intermediate bus voltage (VIB) that has been decremented from the initial to a second predetermined value, and
(iii) determining which of the first and second values of efficiency measure represents a higher system efficiency;
generating control signals in dependence upon the determined first and second efficiency measure values to cause the first stage DC-to-DC converter to set the intermediate bus voltage (VIB) to a value corresponding to the first or second value of efficiency measure depending on which of said first and second values was determined to represent the higher system efficiency;
repeating the efficiency measure determination and the setting of the intermediate bus voltage (VIB) at prescribed time intervals; and
changing the time intervals in dependence upon changes in one or more loads of the intermediate bus architecture power system.

15. The voltage controller according to claim 1, wherein:
the efficiency measuring unit is operable to: determine a first value of a power input to the intermediate bus architecture power system using the received values corresponding to the first intermediate bus voltage (VIB); and determine a second value of the input power, using the received values corresponding to the second, different intermediate bus voltage (VIB); and
the control signal generator is operable to generate, in dependence on the first and second input power values, control signals to cause the intermediate bus voltage to be set to the value corresponding to the lower of the first and second input power values.

16. The voltage controller according to claim 1, wherein the intermediate bus voltage is set to the value corresponding to the lower of the first and second efficiency measure values.

17. The voltage controller according to claim 1, wherein the efficiency measuring unit is configured to sequentially perform steps (i), (ii), and (iii) within each prescribed time interval.

* * * * *